United States Patent
Jitsukawa et al.

(10) Patent No.: US 9,730,191 B2
(45) Date of Patent: Aug. 8, 2017

(54) WIRELESS COMMUNICATION SYSTEM, BASE STATION, MOBILE STATION AND WIRELESS COMMUNICATION METHOD

(71) Applicant: FUJITSU LIMITED, Kawasaki-shi, Kanagawa (JP)

(72) Inventors: Daisuke Jitsukawa, Adachi (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 488 days.

(21) Appl. No.: 13/906,048

(22) Filed: May 30, 2013

(65) Prior Publication Data
US 2013/0259022 A1    Oct. 3, 2013

Related U.S. Application Data

(63) Continuation of application No. PCT/JP2010/071602, filed on Dec. 2, 2010.

(51) Int. Cl.
*H04W 72/04* (2009.01)
*H04W 72/12* (2009.01)
(Continued)

(52) U.S. Cl.
CPC ... *H04W 72/0406* (2013.01); *H04W 72/1273* (2013.01); *H04L 5/003* (2013.01); *H04W 28/048* (2013.01)

(58) Field of Classification Search
None
See application file for complete search history.

(56) References Cited

U.S. PATENT DOCUMENTS

2011/0080896 A1* 4/2011 Krishnamurthy . H04W 56/0045
370/336
2011/0199986 A1* 8/2011 Fong ..................... H04L 5/0035
370/329
(Continued)

FOREIGN PATENT DOCUMENTS

EP       2180739       10/2008
JP    2010-124462       6/2010

OTHER PUBLICATIONS

3GPP TR 36.814 V9.0.0; 3rd Generation Partnership Project; Technical Specification Group Radio Access Network; Evolved Universal Terrestrial Radio Access (E-UTRA); "Further advancements for E-UTRA physical layer aspects (Release 9)"; Mar. 2010.
(Continued)

*Primary Examiner* — Adnan Baig
(74) *Attorney, Agent, or Firm* — Myers Wolin, LLC (57) ABSTRACT

It is an object of the invention to provide a wireless communication system capable of decoding a downlink shared channel of an interfering cell while achieving the reduction of intercell interference to a downlink control channel of an interfered cell. In a wireless communication system that controls transmission timing of each base station so that a control channel transmitted by a first base station and a shared channel transmitted by a second base station temporally overlap, the second base station includes a muting control unit and a muting processing unit that transmit a null symbol in an overlapping time interval of the shared channel with a time interval of the control channel on the basis of the number of code blocks in a data signal component for each mobile station corresponding to the overlapping time interval of the shared channel with the time interval of the control channel.

19 Claims, 9 Drawing Sheets

(51) Int. Cl.
　　　*H04W 28/04*　　　(2009.01)
　　　*H04L 5/00*　　　(2006.01)

(56) References Cited

U.S. PATENT DOCUMENTS

2012/0315948 A1* 12/2012 Frenger ............. H04W 52/0232
　　　　　　　　　　　　　　　　　　　　　　　455/522
2013/0223416 A1* 8/2013 Michel .................. H04W 16/14
　　　　　　　　　　　　　　　　　　　　　　　370/336

OTHER PUBLICATIONS

Fujitsu; "Interference coordination for control channels for HetNet"; Agenda Item: 6.8; 3GPP TSG-RAN WG1 Meeting #61; R1-103227; Montreal, Canada; May 10-14, 2010.
Fujitsu; "Impact of PDSCH RE muting/puncturing on macro-cell performance"; Agenda Item: 6.8.1; 3GPP TSG-RAN WG1 Meeting #61bis; R1-104050; Dresden, Germany; Jun. 28-Jul. 2, 2010.
International search report issued for corresponding International Patent Application No. PCT/JP2010/071602, mailed Mar. 8, 2011, with English translation.
Extended European search report with the supplementary European search report and the European search opinion issued for corresponding European Patent Application No. 10860172.5 mailed on May 11, 2016.
Panasonic, "PDCCH interference Mitigation by Downlink Power Setting for Macro-Femto Scenario", Agenda Item: 6.8.2, 3GPP TSG RAN WG1 Meeting #63, R1-106090, Jacksonville, FL (US), Nov. 15-19, 2010.
Fujitsu, "Discussion on Enhanced ICIC Schemes for Control Channel in HetNet", Agenda Item: 6.8.1, 3GPP TSG RAN WG1 Meeting #61bis, R1-104049, Dresden, Germany, Jun. 28-Jul. 2, 2010.

* cited by examiner

WIRELESS COMMUNICATION SYSTEM, BASE STATION, MOBILE STATION AND WIRELESS COMMUNICATION METHOD

CROSS-REFERENCE TO RELATED APPLICATION

This application is a continuation application of International Application PCT/JP2010/071602, filed on Dec. 2, 2010, and designating the U.S., the entire contents of which are incorporated herein by reference.

FIELD

The present invention relates to a wireless communication system in which cells of base stations which differ in transmission power are intermingled and operated.

BACKGROUND

In LTE (Long Term Evolution)/LTE-A (Advanced) which is a next-generation mobile communication system, with the aim of expanding system capacity and coverage, a heterogeneous network in which macrocells and picocells (including femtocells) coexist has been considered. In this network, these cells are operated at the same frequency; therefore, interference generated between cells becomes a problem. For example, in a case where macrocells and picocells are intermingled and operated, in a mobile station connected to a low-transmission-power pico base station, a downlink desired signal from the pico base station suffers significant interference from a downlink of a macro base station, and the communication quality becomes degraded.

As a technology for reducing such intercell interference, there is FFR (Fractional Frequency Reuse). In the FFR, a pico base station assigns a specific frequency resource to a downlink shared channel to a mobile station on the cell boundary. On the other hand, a macro base station does not transmit a downlink shared channel on the frequency resource, or, if transmitting a downlink shared channel on the frequency resource, transmits the downlink shared channel at low transmission power. Consequently, it is possible to reduce intercell interference in a downlink shared channel.

Meanwhile, downlink control channels are distributed over the entire system bandwidth; therefore, it is difficult to apply the FFR. Therefore, in a system where the timing to transmit a subframe is synchronized between cells, intercell interference occurs between downlink control channels. Thus, conventionally, the timing control between cells is made so that downlink control channels do not overlap, thereby reducing intercell interference in the downlink control channels. Specifically, a macro base station shifts the transmission timing of a pico base station in units of an OFDM symbol so that downlink control channels do not overlap between cells. Then, the macro base station overrides (mutes) a downlink shared channel of the macro base station, which overlaps with a shifted downlink control channel of the pico base station, with a null symbol for zero transmission power. By performing this operation, interference from a downlink shared channel of the macrocell to a downlink control channel of the picocell can be reduced.

Non Patent Document 1: 3GPP TR 36.814 V9.0.0 (2010-03)
Non Patent Document 2: 3GPP R1-103227 (2010-05)

However, in the above-described "method to reduce intercell interference in downlink control channels", the downlink shared channel of the macrocell is overridden with the null symbol for zero transmission power; therefore, in the side of a mobile station, a reception characteristic of the downlink shared channel of the macrocell becomes degraded. Especially, when a downlink radio channel state of the macrocell is good, the number of code blocks, which are units of coding, in one subframe is increased, so if a whole code block is overridden with a null symbol, it is not possible to decode the code block. Namely, in such a case, there is a problem that it is not possible to restore original information bits.

SUMMARY

According to an aspect, a wireless communication system that controls transmission timing of each base station so that a control channel transmitted by a first base station and a shared channel transmitted by a second base station temporally overlap, wherein the second base station includes a transmitting unit that transmits a null symbol in an overlapping time interval of the shared channel with a time interval of the control channel on the basis of the number of code blocks in a data signal component for each mobile station corresponding to the overlapping time interval of the shared channel with the time interval of the control channel.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a wireless communication system disclosed in the present application will be explained in detail below on the basis of drawings. Incidentally, this invention is not limited to these embodiments.

First Embodiment

Figure 1:
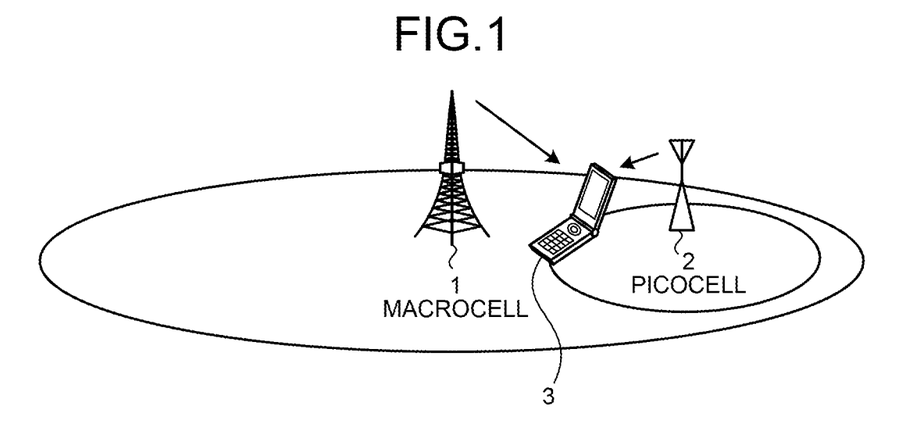
FIG. 1 is a diagram illustrating a configuration example of a wireless communication system.

FIG. 1 is a diagram illustrating a configuration example of a wireless communication system. This wireless communication system is in heterogeneous network deployment that macrocells and cells (picocells, femtocells) of low-transmission-power base stations coexist. Furthermore, this wireless communication system uses OFDMA (Orthogonal Frequency Division Multiple Access) in downlink transmission. As an example, the wireless communication system illustrated in FIG. 1 includes a macro base station 1 and a pico base station 2, and a picocell is placed in a macrocell. Furthermore, a mobile station 3 is a mobile terminal on the boundary of the picocell. Incidentally, in FIG. 1, there is illustrated an example where one picocell is placed in the macrocell; however, actually, multiple cells (picocells, femtocells) shall be placed in the macrocell.

Before explaining a wireless communication method for the wireless communication system of the present embodiment, here we explain an interference control process (a muting method) as a base of the wireless communication method.

Figure 2:
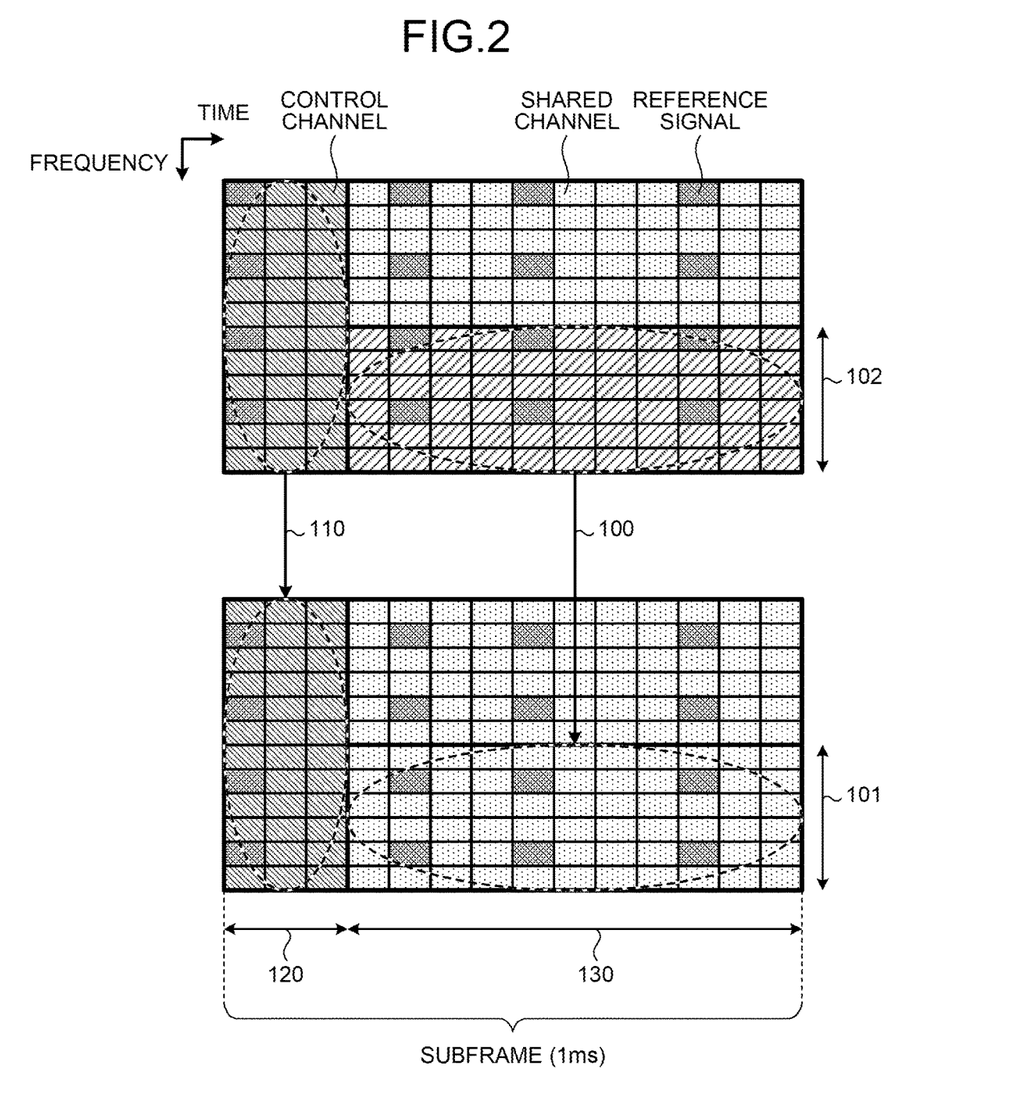
FIG. 2 is a diagram illustrating an example of assignment of frequency resources in transmitting signals of a macro base station and a pico base station.

FIG. 2 is a diagram illustrating an example of assignment of frequency resources in transmitting signals of a macro base station and a pico base station; an upper part of the diagram is an example of a transmitting signal of the macro base station, and a lower part is an example of a transmitting signal of the pico base station. In FIG. 2, a subframe having a length of 1 ms is formed of 14 OFDM symbols in a direction of time, and a downlink control channel is mapped to the front 1 to 3 OFDM symbols (corresponding to a physical control channel region 120 in FIG. 2) in the subframe. The downlink control channel includes a PCFICH (Physical Control Format Indicator CHannel), a PHICH (Physical Hybrid ARQ Indicator CHannel), and a PDCCH (Physical Downlink Control CHannel). A downlink shared channel (a PDSCH (Physical Downlink Shared CHannel)) used for transmission of user data, etc. is mapped to the remaining OFDM symbols (corresponding to a physical shared channel region 130 in FIG. 2). On the other hand, in FIG. 2, as a unit of assignment of a frequency resource, an RB (Resource Block) is formed of 12 subcarriers in a direction of frequency, and the downlink shared channel for each user (mobile station) is frequency-multiplexed RB by RB. Furthermore, reference signals (Cell-specific RS) used for estimation of a channel, etc. are sparsely mapped in the time direction and the frequency direction.

In the assignment of frequency resources as described above, in a system where the timing to transmit a subframe is synchronized between cells, intercell interference may occur between downlink shared channels and between downlink control channels (intercell interferences 100 and 110 in FIG. 2). In "LTE Rel-8", to reduce such intercell interference, the FFR (Fractional Frequency Reuse) technology is applicable. In the FFR, a pico base station assigns a specific frequency resource to a downlink shared channel to a mobile station on the cell boundary (a frequency resource 101 in FIG. 2). On the other hand, a macro base station does not transmit a downlink shared channel on the frequency resource (transmit a null symbol), or, if transmitting a downlink shared channel on the frequency resource, transmits the downlink shared channel at low transmission power (a frequency resource 102 in FIG. 2).

Figure 3:
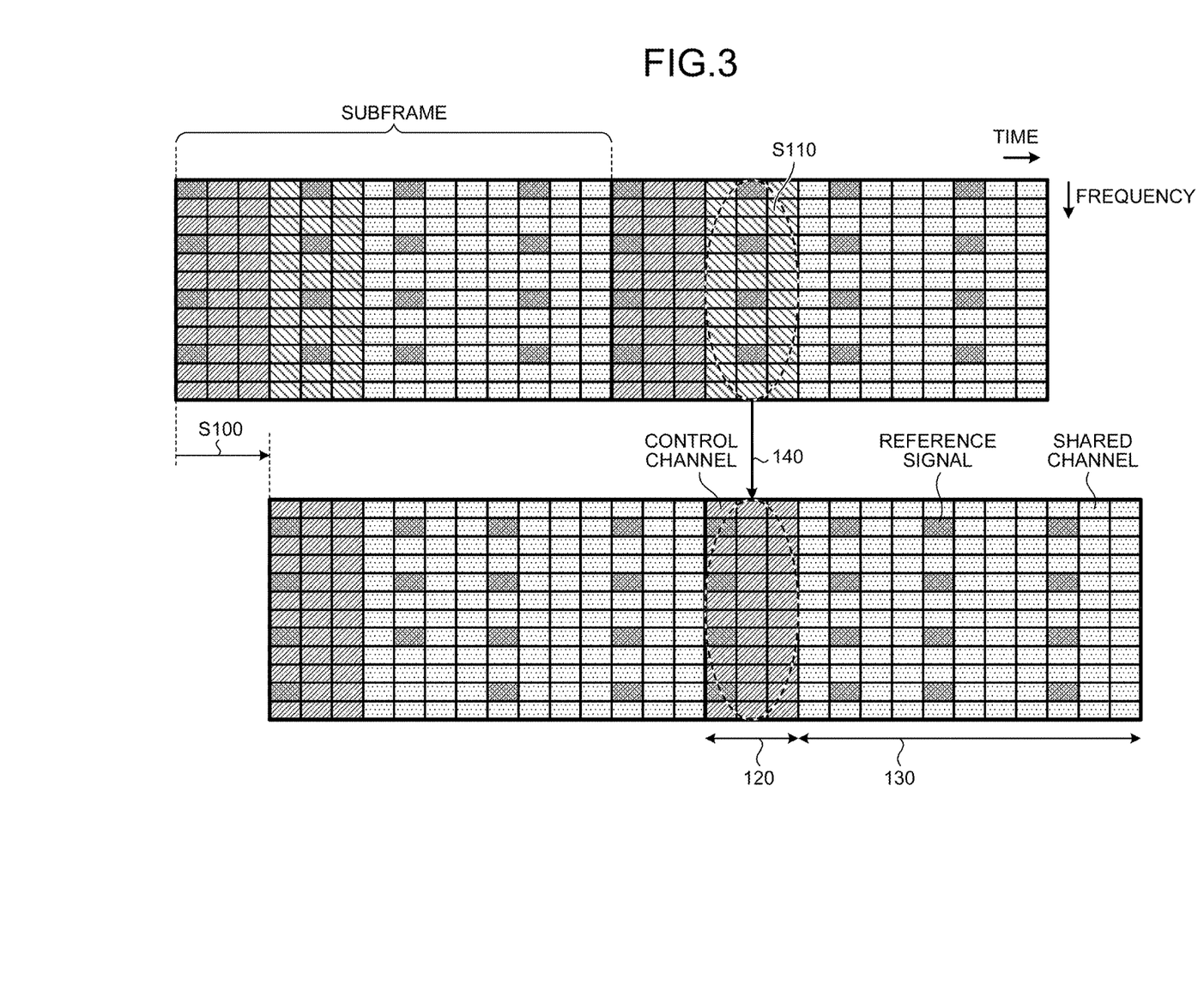
FIG. 3 is a diagram illustrating a principle for reducing intercell interference in downlink control channels.

Meanwhile, in FIG. 2, downlink control channels are distributed over the entire system bandwidth; therefore, it is difficult to apply the FFR. Therefore, as for the downlink control channels, intercell interference is reduced by performing a process as illustrated in FIG. 3. FIG. 3 is a diagram illustrating a principle for reducing intercell interference in downlink control channels; an upper part of the diagram is an example of a transmitting signal of a macro base station, and a lower part is an example of a transmitting signal of a pico base station.

In FIG. 3, to reduce intercell interference in downlink control channels, the macro base station shifts the transmission timing of the pico base station in units of an OFDM symbol (S100). Here, the transmission timing of the pico base station is delayed by 3 OFDM symbols. However, in this state, interference from a downlink shared channel of the macro base station to a downlink control channel of the pico base station occurs (an intercell interference 140 in FIG. 3). Therefore, the macro base station overrides (mutes) an overlapping portion of the downlink shared channel of the macro base station with the downlink control channel of the pico base station with a null symbol for zero transmission power (S110). By performing this operation, interference from a downlink shared channel of the macrocell to a downlink control channel of the picocell can be reduced.

However, the muting degrades reception characteristics of downlink shared channels of the macrocell. A degree of degradation basically depends on an amount of resource to be muted; however, under a condition described below, the reception characteristics become degraded significantly.

Figure 4:
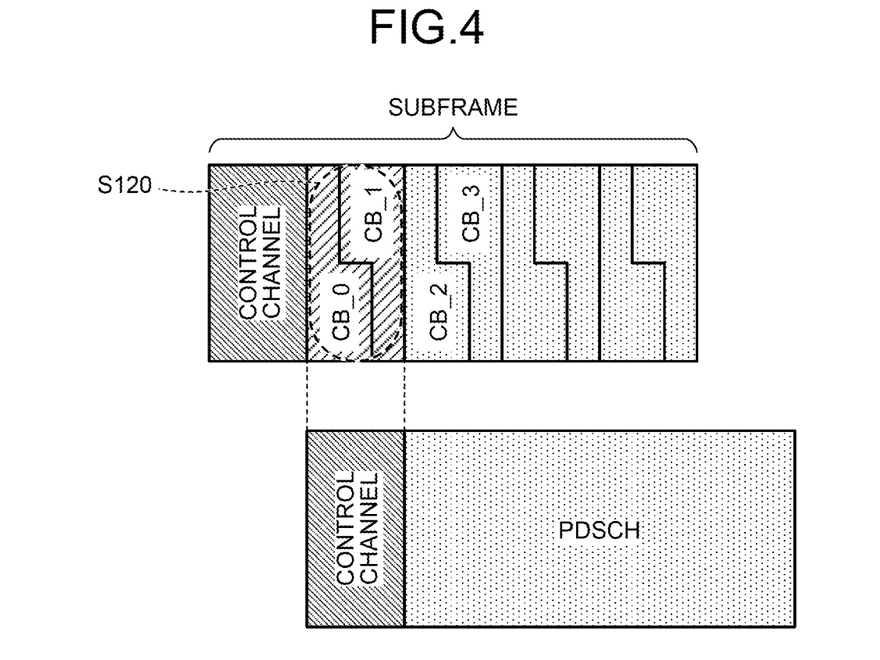
FIG. 4 is a diagram illustrating an example of mapping of code blocks.

For example, in a downlink shared channel of LTE, turbo coding is performed by dividing an information bit string transmitted in one subframe into units of a maximum of 6144 bits (code blocks). Furthermore, the better the radio channel state is, the higher-efficiency transmission format is applied by the control of AMC (adaptive modulation); therefore, the number of code blocks in a subframe is increased. When these code blocks are mapped to frequency resources, the code blocks are mapped in the subframe, for example, to fill the subframe from the front as illustrated in FIG. 4. FIG. 4 is a diagram illustrating an example of mapping of code blocks (CB_0, CB_1, CB_2, CB_3, . . . ); an upper part of the diagram is an example of a transmitting signal of a macro base station, and a lower part is an example of a transmitting signal of a pico base station. When the mapping is performed, as for a subframe with few code blocks (a data signal for a specific mobile station), a code block is partially muted, and the code block still has a part which is not muted. However, as for a subframe with many code blocks, as illustrated in FIG. 4, one or more code blocks are wholly muted (S120); therefore, it may be impossible for a receiving-side mobile station to restore information bits of the code blocks.

Namely, in the case of FIG. 4, the reduction of intercell interference to a downlink control channel of a picocell can be achieved; however, on the other hand, it may be impossible for a downlink shared channel of a macrocell to be correctly decoded on the side of a mobile station. Therefore, in the present embodiment, a muting method is devised so that the downlink shared channel of the macrocell can be correctly decoded on the side of the mobile station while achieving the reduction of intercell interference to the downlink control channel of the picocell.

Figure 5:
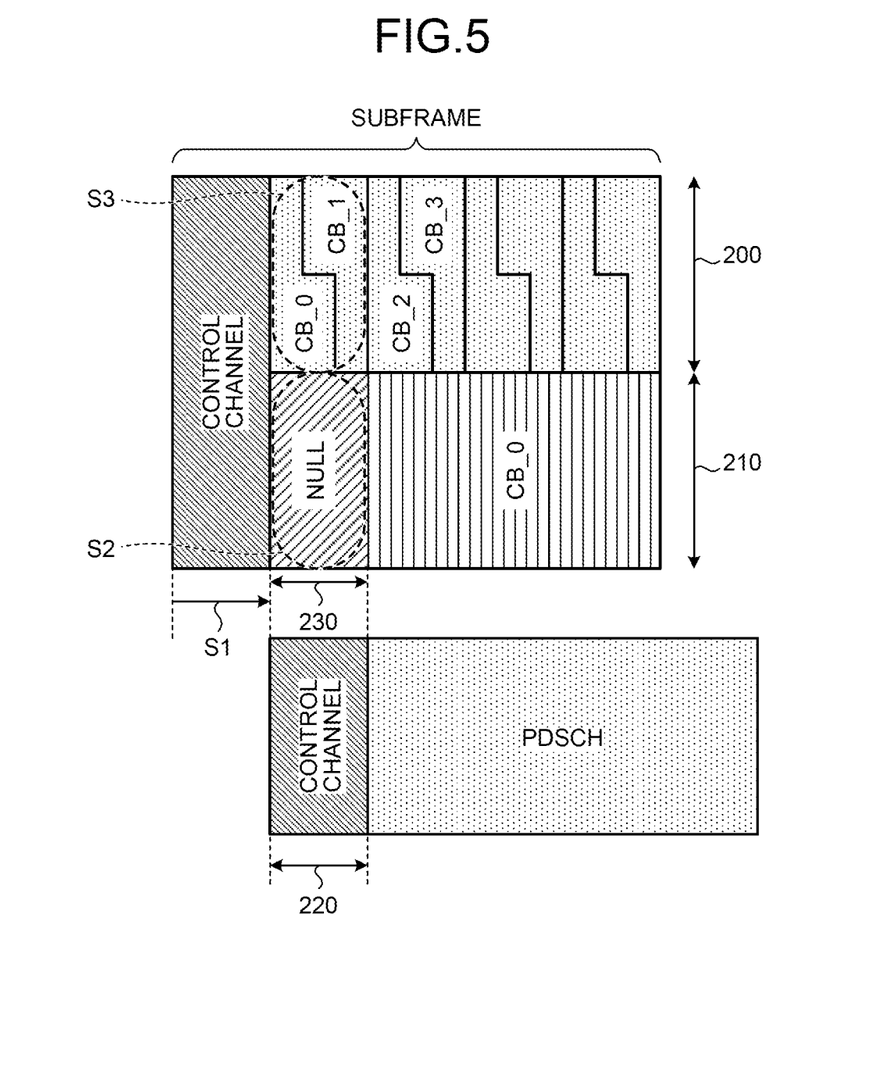
FIG. 5 is a diagram illustrating an example of a muting method.

Subsequently, a wireless communication method (a muting method) in the present embodiment is explained. FIG. 5 is a diagram illustrating an example of a muting method of the first embodiment; an upper part of the diagram is an example of a transmitting signal of the macro base station 1, and a lower part is an example of a transmitting signal of the pico base station 2. In FIG. 5, a data signal (CB_0, CB_1, CB_2, CB_3, . . . ) for a mobile station #1 is mapped to a region 200 of a downlink shared channel, and a data signal (CB_0) for a mobile station #2 is mapped to a region 210 of the downlink shared channel.

In the present embodiment, in the same manner as in FIG. 3, to avoid intercell interference between downlink control channels, the macro base station 1 first shifts the transmission timing of the pico base station 2 in units of an OFDM symbol (S1). Here, as an example, the macro base station 1 controls to delay the transmission timing of the pico base station 2 by 3 OFDM symbols to eliminate temporal overlap between downlink control channels of the macrocell and the picocell.

Next, with respect to each data signal for mobile stations, the macro base station 1 determines a muting amount of a data signal component 230 for each of the mobile stations which overlaps with a control channel region 220 of the picocell on the basis of the number of code blocks in a data signal for each of the mobile stations (S2, S3). Namely, a data signal component of a macrocell which overlaps with a downlink control channel of a picocell is muted on the basis of the number of code blocks in a downlink shared channel.

For example, when the number of code blocks in a data signal for a specific mobile station in the macrocell is less than a predetermined threshold value, the macro base station 1 mutes a whole signal component for the mobile station which overlaps with the control channel region 220 of the picocell (S2). On the other hand, when the number of code blocks is equal to or greater than the predetermined threshold value, the macro base station 1 does not mute the signal component for the mobile station (S3).

Here, the muting method of the present embodiment is explained in more detail by using equations. In the present embodiment, the above-mentioned muting amount (including a case where the muting is not performed) is determined, for example, on the basis of a "degree to which reception characteristics of downlink shared channels of the macrocell become degraded due to the muting".

In the LTE, a region surrounded by one subcarrier and one OFDM symbol is defined to be an RE (Resource Element) as the minimum unit of a resource. The number of REs mapped as a downlink shared channel is denoted by $N_{RE}$, and the number of code blocks in the downlink shared channel is denoted by $N_{CB}$. At this time, the macro base station 1 uses the following equation (1) as an indicator of the above "degree to which reception characteristics of downlink shared channels of the macrocell become degraded due to the muting". Namely, a ratio $R_{MT}$ of the number $N_{MT}$ of REs to be muted to the number $N_{RE\_CB}$ ($N_{RE\_CB}=N_{RE}/N_{CB}$) of REs per code block is used as the indicator.

$$R_{MT}=N_{MT}/N_{RE\_CB}=(N_{MT}\times N_{CB})/N_{RE} \quad (1)$$

Then, the macro base station 1 determines a muting amount, which is an amount of resource to be muted, so that a value of $R_{MT}$ is equal to or lower than an acceptable value $R_{MT\_limit}$ (for example, 0.3). Here we concretely explain a process of determining this muting amount, where an amount of overlapping resource in the downlink shared channel of the macro base station 1 which overlaps with the downlink control channel of the pico base station 2 is denoted by $N_{OL}$. For example, provided that $N_{MT}=N_{OL}$, when "$R_{MT} \leq R_{MT\_limit}$" is satisfied, it is determined that the number of code blocks in the downlink shared channel of the macrocell is less than the predetermined threshold value, and the whole $N_{OL}$ is muted. Otherwise, it is determined that the number of code blocks in the downlink shared channel of the macrocell is equal to or greater than the predetermined threshold value, and the muting is not performed.

Incidentally, in the above, the muting is not performed in cases other than the case of "$R_{MT} \leq R_{MT\_limit}$" provided that $N_{MT}=N_{OL}$; however, it is not limited to this. For example, in cases other than the case of "$R_{MT} \leq R_{MT\_limit}$" provided that $N_{MT}=N_{OL}$, a muting amount $N_{MT}$ can be determined so as to satisfy $R_{MT}=R_{MT\_limit}$ according to the following equation (2).

$$N_{MT}=N_{RE\_CB}\times R_{MT\_limit}=(N_{RE}\times R_{MT\_limit})/N_{CB} \quad (2)$$

By performing this operation, a specific code block can be prevented from being wholly muted.

Figure 6:
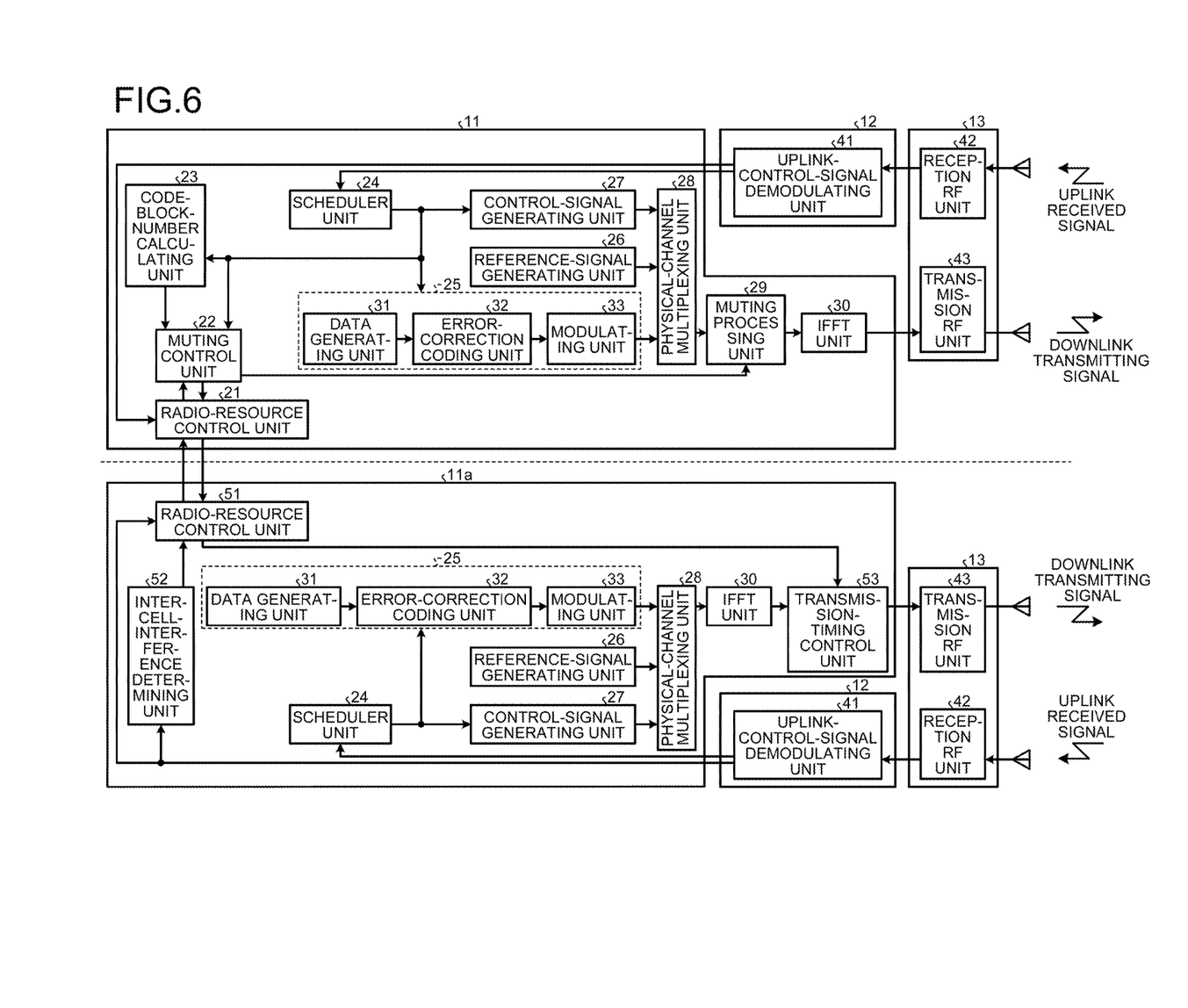
FIG. 6 is a diagram illustrating a configuration example of base stations.

Subsequently, a wireless communication system capable of achieving the wireless communication method (the muting method) of the present embodiment is explained in detail with reference to drawings. FIG. 6 is a diagram illustrating a configuration example of base stations; an upper part of the diagram is the macro base station 1, and a lower part is the pico base station 2.

In FIG. 6, the macro base station 1 includes a downlink-signal generating unit 11, an uplink-signal demodulating unit 12, and a transmitting/receiving unit 13; the pico base station 2 includes a downlink-signal generating unit 11a, the uplink-signal demodulating unit 12, and the transmitting/receiving unit 13. The uplink-signal demodulating unit 12 and the transmitting/receiving unit 13 are the same components between the macro base station 1 and the pico base station 2; the respective uplink-signal demodulating units 12 include an uplink-control-signal demodulating unit 41, and the respective transmitting/receiving units 13 include a reception RF unit 42 and a transmission RF unit 43. The respective downlink-signal generating units include a scheduler unit 24, a data-signal generating unit 25, a reference-signal generating unit 26, a control-signal generating unit 27, a physical-channel multiplexing unit 28, and an IFFT (Inverse Fast Fourier Transform) unit 30 in common. The downlink-signal generating unit 11 further includes a radio-resource control unit 21, a muting control unit 22, a code-block-number calculating unit 23, and a muting processing unit 29. The downlink-signal generating unit 11a further includes a radio-resource control unit 51, an intercell-interference determining unit 52, and a transmission-timing control unit 53.

Incidentally, the above-described components of the base stations are a list of components involved in processes of the present embodiment for convenience of explanation, and these components are not all components of the base stations. Furthermore, the downlink-signal generating units, the uplink-signal demodulating units, and the transmitting/receiving units of the macro base station 1 and the pico base station 2 can be composed of, for example, a CPU (Central Processing Unit), an FPGA (Field Programmable Gate Array), and a memory, etc.

Here, the operations of the components common to both the macro base station 1 and the pico base station 2 are explained briefly. The reception RF unit 42 performs conversion from a radio frequency into a baseband on an uplink received signal, and further performs processes, such as quadrature demodulation and A/D conversion, on the converted uplink received signal. The uplink-control-signal demodulating unit 41 demodulates an uplink control signal out of signals output from the reception RF unit 42, and restores a CQI (Channel Quality Indicator) and RSRP (Reference Signal received power) of each cell which are control information. The scheduler unit 24 performs a process of assigning a frequency resource to a data signal for each mobile station and a process of determining an MCS (Modulation and Coding Scheme) and the number of information bits, etc. on the basis of a CQI notified by the mobile station. Then, the scheduler unit 24 outputs results of these processes as resource assignment information. The data-signal generating unit 25 (a data generating unit 31, an error-correction coding unit 32, a modulating unit 33) generates a data signal on the basis of the resource assignment information. The control-signal generating unit 27 generates a downlink control signal on the basis of resource assignment information, and the reference-signal generating unit 26 generates a reference signal (Cell Specific RS (Reference signal)). Then, the physical-channel multiplexing unit 28 performs frequency multiplexing of a signal of each physical channel. After that, the IFFT unit 30 performs an IFFT process and a CP (Cyclic Prefix) adding process on the multiplexed signal, and the transmission RF unit 43 performs D/A conversion and quadrature modulation on the processed multiplexed signal, and further performs conversion from a baseband into a radio frequency on the processed multiplexed signal, and lastly amplifies power, and then transmits a downlink signal. Information on an RSRP of each cell notified by each mobile station is transferred to the radio-resource control unit (21, 51), and is used in the handover control, etc.

Subsequently, the operations of components other than the common components in the macro base station 1 and the pico base station 2 are explained.

The intercell-interference determining unit 52 of the pico base station 2 first estimates a state of intercell interference in each mobile station on the basis of information on an RSRP of each cell notified by the mobile station. Specifically, a state of intercell interference is estimated on the basis of a parameter $\alpha$=RSRP_S/RSRP_I, where RSRP_S is an RSRP of the picocell, and RSRP_I is an RSRP of the adjacent macrocell. Next, the intercell-interference determining unit 52 determines whether to request the implementation of the above-described muting method of the present embodiment to the adjacent macrocell on the basis of $\alpha$ in each mobile station. Specifically, using the minimum value, the bottom 5% of values, an intermediate value, or an average value, etc. of respective parameters $\alpha$ in mobile stations as a criterion for determination, the intercell-interference determining unit 52 determines to "request the implementation of the muting method of the present embodiment" if the criterion for determination is less than a predetermined threshold value. A result of the determination is transferred to the radio-resource control unit 51 as a muting request signal.

The radio-resource control unit 51 notifies the radio-resource control unit 21 of the macro base station 1 of the muting request signal and control region information (the number of OFDM symbols to which a downlink control signal of the pico base station 2 is mapped) via a wire interface.

Furthermore, the radio-resource control unit 51 receives information on a time shift amount to be described later (time shift amount information) from the radio-resource control unit 21 of the macro base station 1. The transmission-timing control unit 53 shifts the timing to transmit a downlink signal in units of an OFDM symbol on the basis of the time shift amount information obtained from the radio-resource control unit 51.

On the other hand, the code-block-number calculating unit 23 calculates the number of code blocks on the basis of the number of information bits included in resource assignment information obtained from the scheduler unit 24 with respect to each data signal for each mobile station connected to the macro base station 1.

The muting control unit 22 first determines whether to actually implement the muting method of the present embodiment on the basis of a muting request signal notified by a neighboring pico base station (including a femto base station). Criteria for the determination can include whether the number of muting request signals exceeds a predetermined threshold value, etc. For example, when emphasis is put on the reduction of interference from a downlink shared channel of the macro base station 1 to a downlink control channel of a pico base station (including a femto base station) as a system design principle, the muting method of the present embodiment is implemented upon receipt of one or more muting request signals. Furthermore, when emphasis is put on the balance of transmission efficiency in consideration of a trade-off relationship of transmission efficiency between a pico base station and a macro base station as a system design principle, the muting method of the present embodiment is implemented, for example, upon receipt of muting request signals from more than half of pico base stations. The trade-off relationship of transmission efficiency between a pico base station and a macro base station means a relationship that "the larger the muting amount, the further the transmission efficiency of the pico base station is improved, while the further the transmission efficiency of the macro base station is down".

In the above-described determining process, when having determined to "implement the muting method of the present embodiment", the muting control unit 22 next determines a time shift amount in the pico base station which transmitted the muting request signal. For example, the time shift amount is determined so that control channel regions do not overlap between the macrocell and the picocell. Incidentally, in the present embodiment, a time shift amount is determined so that control channel regions do not overlap between cells; however, it is not limited to this, and a time shift amount can be determined so that the control channel regions have less overlap.

Next, the muting control unit 22 determines a muting amount on the basis of control region information of the picocell, the number of code blocks in a data signal for each mobile station in the macrocell, and resource assignment information. In the present embodiment, the above-described muting method of the present embodiment is implemented, and a muting amount of a signal component overlapping with a control channel region of the picocell is determined with respect to each data signal for each mobile station. Then, as a result of the determination, muting control information is transferred to the muting processing unit 29. The muting processing unit 29 performs muting (a process to override with a null symbol) on the basis of the muting control information transferred from the muting control unit 22.

Figure 7:
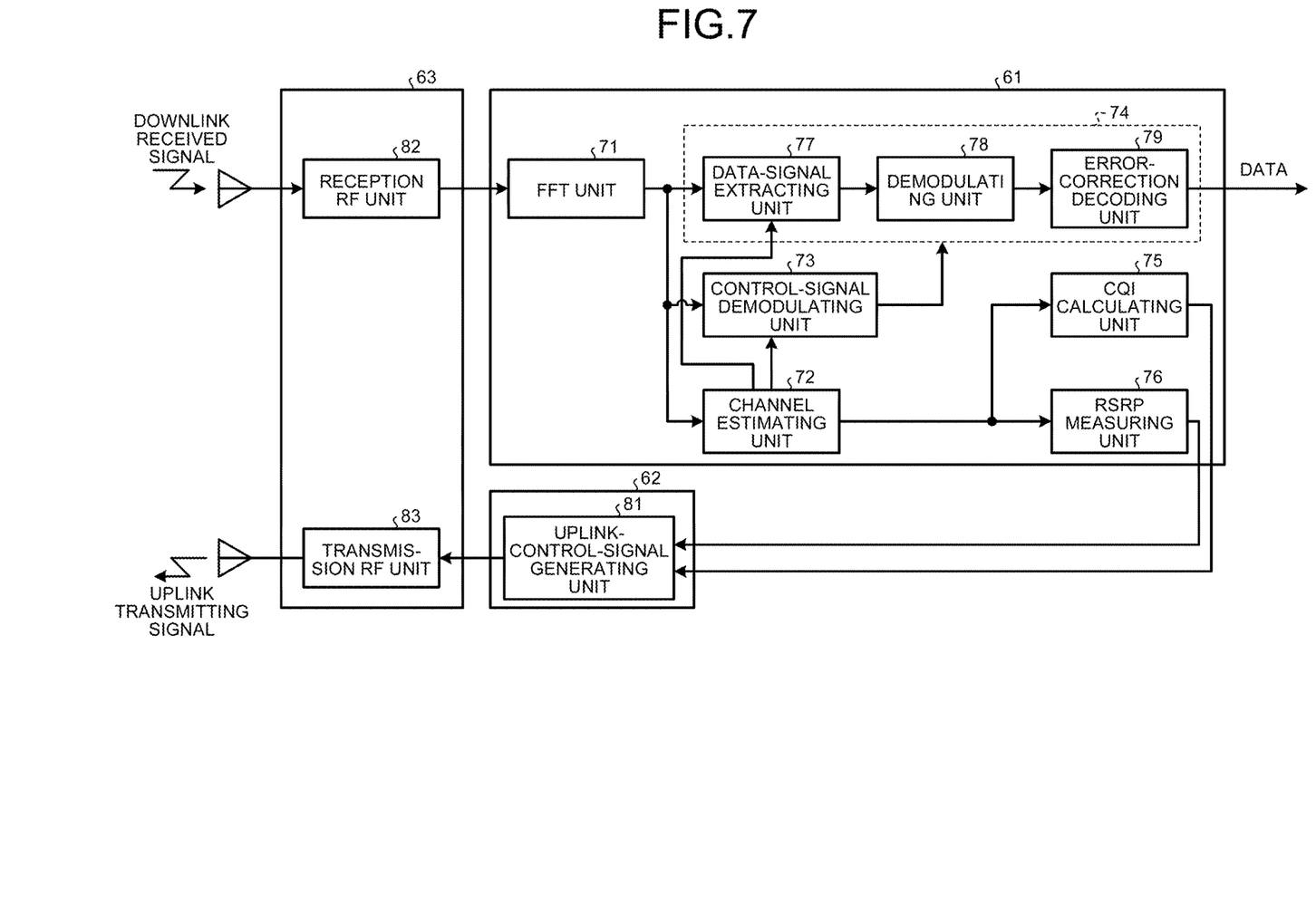
FIG. 7 is a diagram illustrating a configuration example of a mobile station.

FIG. 7 is a diagram illustrating a configuration example of the mobile station 3. In FIG. 7, the mobile station 3 includes a downlink-signal demodulating unit 61, an uplink-signal generating unit 62, and a transmitting/receiving unit 63. The downlink-signal demodulating unit 61 includes an FFT unit 71, a channel estimating unit 72, a control-signal demodulating unit 73, a data-signal demodulating unit 74, a CQI calculating unit 75, and an RSRP measuring unit 76. The uplink-signal generating unit 62 includes an uplink-control-signal generating unit 81, and the transmitting/receiving unit 63 includes a reception RF unit 82 and a transmission RF unit 83. Incidentally, the downlink-signal demodulating unit, the uplink-signal generating unit, and the transmitting/receiving unit of the mobile station 3 can be composed of, for example, a CPU (Central Processing Unit), an FPGA (Field Programmable Gate Array), and a memory, etc.

Here, the operation of the mobile station 3 is explained. The reception RF unit 82 performs conversion from a radio frequency into a baseband on a downlink received signal, and further performs quadrature demodulation and A/D conversion on the converted downlink received signal.

The FFT unit 71 detects the timing to clip the A/D-converted received signal, and performs FFT on the received signal after removing CP from the received signal, thereby generating a frequency range of received signal. The channel estimating unit 72 calculates a cross correlation between a reference signal extracted from the received signal in frequency domain and a replica of a known reference signal, thereby obtaining a channel estimate value. Incidentally, this channel estimating process is performed on not only a cell which is being used by the mobile station 3 but also its surrounding cells. The control-signal demodulating unit 73 extracts a downlink control signal embedded in a known location from the received signal in frequency domain, and performs channel compensation and demodulation on the downlink control signal on the basis of the channel estimate value, thereby restoring resource assignment information as control information. The data-signal demodulating unit 74 (a data-signal extracting unit 77, a demodulating unit 78, an error-correction decoding unit 79) extracts a data signal from the received signal in frequency domain on the basis of the resource assignment information, and performs channel compensation and decoding on the data signal on the basis of the channel estimate values, thereby restoring original data.

The CQI calculating unit 75 calculates CQI (channel quality information) by using the channel estimate value of the cell. The RSRP measuring unit 76 measures RSRP (received power) of a reference signal of each cell by using the channel estimate values of the cell and its surrounding cells.

The uplink-control-signal generating unit 81 generates an uplink control signal on the basis of the control information including the CQI and the RSRP of each cell. Then, the transmission RF unit 83 performs D/A conversion and quadrature modulation on the uplink control signal generated by the uplink-control-signal generating unit 81, and further performs conversion from a baseband to a radio frequency on the uplink control signal, and lastly amplifies power, and then transmits an uplink signal.

As described above, in the present embodiment, to avoid intercell interference between downlink control channels, the macro base station 1 shifts the transmission timing of the pico base station 2 in units of an OFDM symbol. Then, with respect to each data signal for a mobile station, the macro base station 1 determines a muting amount of a signal component which overlaps with a control channel region of the picocell on the basis of the number of code blocks in a shared channel region of the macrocell. Consequently, it is possible to decode a downlink shared channel of the macrocell on the side of the mobile station while achieving the reduction of intercell interference to the downlink control channel of the picocell.

Second Embodiment

A wireless communication method (a muting method) of a second embodiment is explained. Incidentally, a configuration of a wireless communication system is the same as in the first embodiment described above. Furthermore, configurations of a base station and a mobile station are the same as in the first embodiment described above. In the present embodiment, the muting control unit 22 of the macro base station 1 determines a muting amount by the following method, and the muting processing unit 29 performs muting (a process to override with a null symbol) on the basis of the muting amount. Incidentally, the operations other than the muting control unit 22 are the same as in the first embodiment. A process different from that in the first embodiment is explained below.

Figure 8:
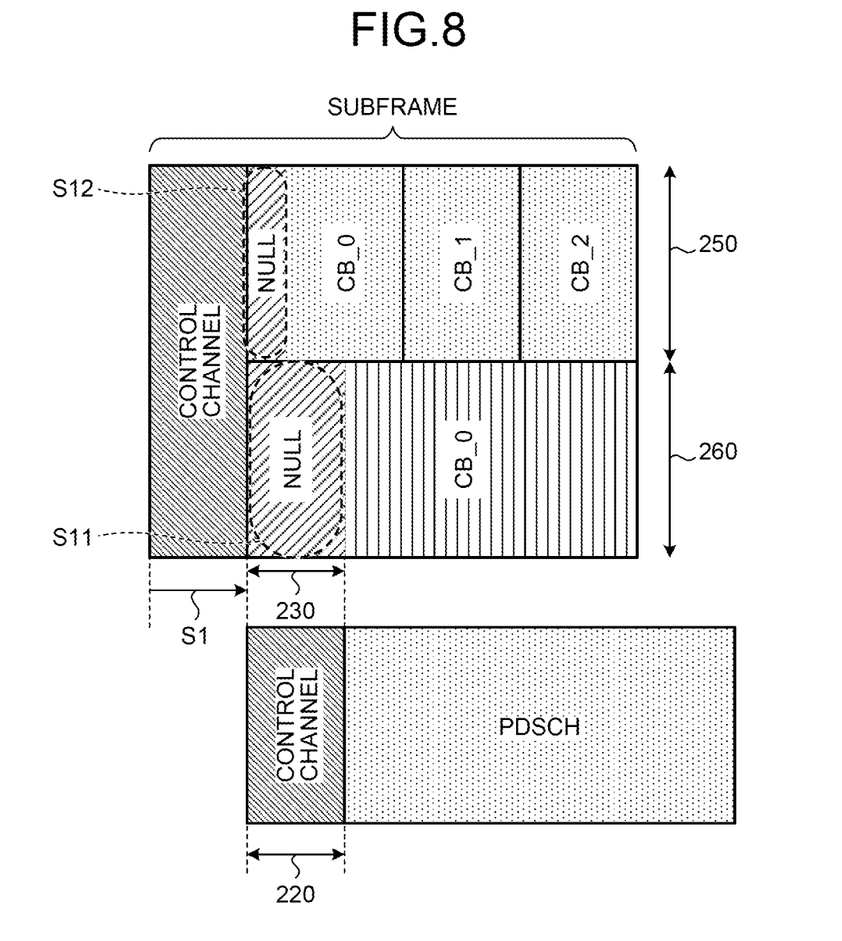
FIG. 8 is a diagram illustrating an example of a muting method.

FIG. 8 is a diagram illustrating an example of the muting method of the second embodiment; an upper part of the diagram is an example of a transmitting signal of a macro base station, and a lower part is an example of a transmitting signal of a pico base station. In FIG. 8, a data signal (CB_0, CB_1, CB_2) for a mobile station #1 is mapped to a region 250 of a downlink shared channel, and a data signal (CB_0) for a mobile station #2 is mapped to a region 260 of the downlink shared channel.

After the execution of S1 described above, with respect to each data signal for each mobile station, the muting control unit 22 determines a muting amount of a data signal component 230 of a macrocell which overlaps with a control channel region 220 of a picocell on the basis of the number of code blocks in a data signal for each mobile station. Specifically, when the number of code blocks in a data signal for a specific mobile station in the macrocell is one, the muting control unit 22 determines the whole data signal component 230 for the mobile station which overlaps with the control channel region 220 of the picocell as a muting amount (S11). Furthermore, when the number of code blocks in a data signal for a specific mobile station in the macrocell is three, the muting control unit 22 determines one third of the data signal component 230 for the mobile station which overlaps with the control channel region 220 of the picocell as a muting amount (S12).

Namely, the macro base station 1 of the present embodiment mutes, out of a signal component for a specific mobile station which overlaps with the control channel region 220 of the picocell, an amount of the signal component (an amount of resource) which is inversely proportional to the number of code blocks in a data signal for the mobile station in the macrocell. Incidentally, in FIG. 8, when a portion of the data signal component 230 which overlaps with the control channel region 220 of the picocell is muted, a front portion of the signal component 230 is muted; however, a portion of the signal component 230 to be muted is not limited to this. Any portion within the signal component 230 can be set arbitrarily.

In this manner, in the present embodiment, a proportion of an amount of resource to be actually muted to an amount of resource of code block(s) is maintained constant. Consequently, it is possible to reduce characteristic degradation due to the muting to the same degree.

Third Embodiment

A wireless communication method (a muting method) of a third embodiment is explained. Incidentally, a configuration of a wireless communication system is the same as in the first embodiment described above. Furthermore, configurations of a base station and a mobile station are the same as in the first embodiment described above. In the present embodiment, there is provided an example of how to mute when the muting control unit 22 of the macro base station 1 determines a muting amount using the equation (2) described in the first embodiment. Incidentally, the other operations are the same as in the first embodiment. A process different from that in the first embodiment is explained below.

Figure 9:
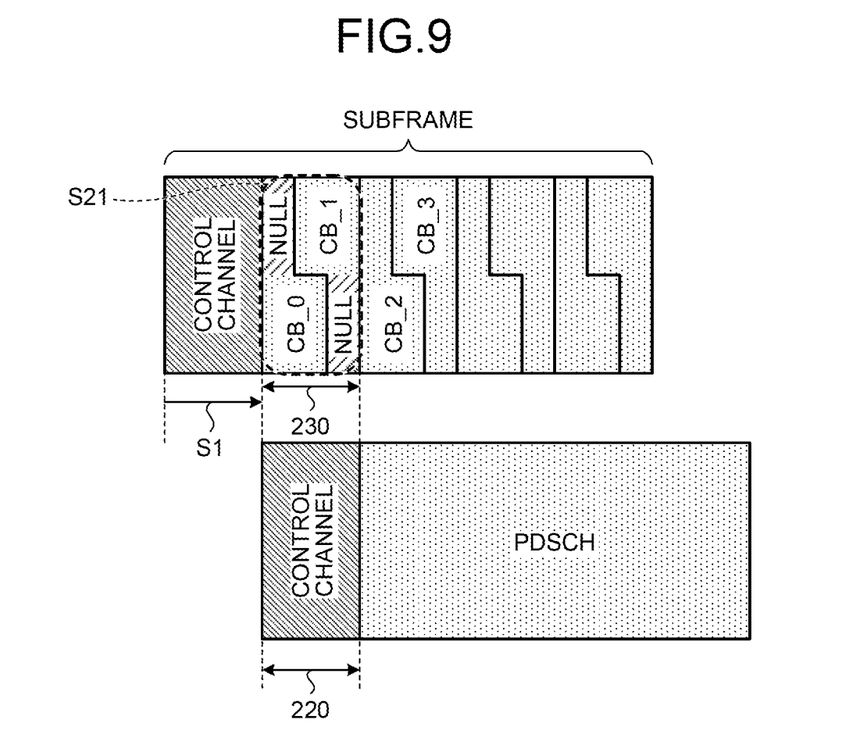
FIG. 9 is a diagram illustrating an example of a muting method.

FIG. 9 is a diagram illustrating an example of the muting method of the third embodiment; an upper part of the diagram is an example of a transmitting signal of a macro base station, and a lower part is an example of a transmitting signal of a pico base station. In FIG. 9, a data signal (CB_0, CB_1, CB_2, CB_3, . . . ) for a mobile station is mapped to a downlink shared channel of a macrocell.

After having determined a muting amount $N_{MT}$ using the equation (2), the muting control unit 22 determines whether multiple code blocks are included in a data signal component 230 for a specific mobile station in a macrocell which overlaps with a control channel region 220 of a picocell. For example, when multiple code blocks are included, the muting control unit 22 transfers muting control information including the muting amount $N_{MT}$ and an instruction to mute an equal amount of resource among the multiple code blocks to the muting processing unit 29.

The muting processing unit 29, which has received the muting control information, mutes an equal amount of resource of each of the multiple code blocks in the data signal component 230 on the basis of the muting amount $N_{MT}$ (S21).

As described above, in the present embodiment, by muting an equal amount of resource among the multiple code blocks, an amount of resource to be muted can be prevented from being biased for a specific code block.

Incidentally, in the present embodiment, as an example, a muting amount $N_{MT}$ is determined by the equation (2); however, it is not limited to this. For example, a muting amount can be determined by any other methods as long as the methods are a method to determine a portion of the data signal component 230 of the macrocell which overlaps with the control channel region 220 of the picocell as a muting amount.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

According to one aspect of a wireless communication system disclosed in the present application, it is possible to decode a downlink shared channel of an interfering cell while achieving the reduction of intercell interference to a downlink control channel of an interfered cell.

What is claimed is:

1. A wireless communication system that controls transmission timing of a first base station and a second base station so that a control channel transmitted by the first base station and a shared channel transmitted by the second base station temporally overlap, wherein the second base station includes
a transmitting unit that transmits the shared channel including a data signal component for a mobile station, the data signal component being coded into a code block or code blocks; and
a downlink-signal generating unit that executes a muting process in an overlapping time interval that is a time interval when the control channel and the shared channel temporally overlap to override a portion of the code block or of a code block among the code blocks for the mobile station with a null symbol, an amount of the portion being determined on the basis of a number of code blocks for the mobile station, and
the transmitting unit transmits the shared channel, the null symbol being included therein in the overlapping time interval.

2. The wireless communication system according to claim 1, wherein
when the number of code blocks for the mobile station is less than a predetermined threshold value, the downlink-signal generating unit executes the muting process to override all data signal component for the mobile station that is transmitted in the overlapping time interval with a null symbol, and
when the number of code blocks is equal to or more than the predetermined threshold value, the downlink-signal generating unit determines not to perform the muting process on the data signal component for the mobile station.

3. The wireless communication system according to claim 1, wherein
when the number of code blocks for the mobile station is less than a predetermined threshold value, the downlink-signal generating unit executes the muting process to override all data signal component for the mobile station that is transmitted in the overlapping time interval with a null symbol, and
when the number of code blocks is equal to or more than the predetermined threshold value, the downlink-signal generating unit executes the muting process to override a portion of the data signal component for the mobile station with a null symbol, the portion being transmitted within the overlapping time interval.

4. The wireless communication system according to claim 1, wherein the downlink-signal generating unit executes the muting process to override a portion of the data signal component transmitted in the overlapping time interval with a null symbol, an amount of the portion being inversely proportional to the number of code blocks of the data signal component for the mobile station.

5. The wireless communication system according to claim 1, wherein when multiple code blocks of the data signal component for the mobile station are transmitted in the overlapping time interval, the downlink-signal generating unit equally mutes a portion of each of the multiple code blocks on the basis of an amount of resource to be muted.

6. The wireless communication system according to claim 1, wherein
the first base station includes an intercell-interference determining unit that determines a state of intercell interference on the basis of received power information of a cell of the first base station and received power information of a cell of the second base station and transmits a muting request signal to the second base station when having determined to implement the muting process due to the intercell interference, and
the downlink-signal generating unit of the second base station determines whether to execute the muting process on the basis of a number of received muting request signals.

7. A base station that operates as a second base station in a wireless communication system that controls transmission timing of a first base station and the second base station so that a control channel transmitted by the first base station and a shared channel transmitted by the second base station temporally overlap, the base station comprising:
a calculating unit that calculates a number of code blocks into which a data signal component for a mobile station is coded, the data signal component being included in the shared channel;

a downlink-signal generating unit that executes a muting process in an overlapping time interval that is a time interval when the control channel and the shared channel temporally overlap to override a portion of a code block for the mobile station with a null symbol, an amount of the portion being determined on the basis of the number of code blocks; and a transmitting unit that transmits the shared channel, the null symbol being included therein in the overlapping time interval.

8. The base station according to claim 7, wherein
when the number of code blocks for the mobile station is less than a predetermined threshold value, the downlink-signal generating unit executes the muting process to override all data signal component for the mobile station that is transmitted in the overlapping time interval with a null symbol, and
when the number of code blocks is equal to or more than the predetermined threshold value, the downlink-signal generating unit determines not to perform the muting process on the data signal component for the mobile station.

9. The base station according to claim 7, wherein
when the number of code blocks for the mobile station is less than a predetermined threshold value, the downlink-signal generating unit executes the muting process to override all data signal component for the mobile station that is transmitted in the overlapping time interval with a null symbol, and
when the number of code blocks is equal to or more than the predetermined threshold value, the downlink-signal generating unit executes the muting process to override a portion of the data signal component for the mobile station with a null symbol, the portion being transmitted within the overlapping time interval.

10. The base station according to claim 7, wherein the downlink-signal generating unit executes the muting process to override a portion of the data signal component transmitted in the overlapping time interval with a null symbol, an amount of the portion being inversely proportional to the number of code blocks of the data signal component for the mobile station.

11. The base station according to claim 7, wherein when multiple code blocks of the data signal component for the mobile station are transmitted in the overlapping time interval, the downlink-signal generating unit equally mutes a portion of each of the multiple code blocks on the basis of an amount of resource to be muted.

12. The base station according to claim 7, wherein when the first base station determines a state of intercell interference on the basis of received power information of a cell of the first base station and received power information of a cell of the second base station, determines to implement the muting process due to the intercell interference, and transmits a muting request signal to the second base station, the downlink-signal generating unit determines whether to execute the muting process on the basis of a number of received muting request signals.

13. A wireless communication method for a wireless communication system that controls transmission timing of a first base station and a second base station so that a control channel transmitted by the first base station and a shared channel transmitted by the second base station temporally overlap, the wireless communication method comprising:
the second base station transmitting, using a processor, the shared channel including a data signal component for a mobile station, the data signal component being coded into a code block or code blocks; and
the second base station executing, using the processor, a muting process in an overlapping time interval that is a time interval when the control channel and the shared channel temporally overlap to override a portion of the code block or of a code block among the code blocks for the mobile station with a null symbol, an amount of the portion being determined on the basis of a number of code blocks for the mobile station, and the second base station also transmitting, using the processor, the shared channel, the null symbol being included therein in the overlapping time interval.

14. The wireless communication method according to claim 13, further comprising:
when the number of code blocks for the mobile station is less than a predetermined threshold value, the second base station executing, using the processor, the muting process to override all data signal component for the mobile station that is transmitted in the overlapping time interval with a null symbol; and
when the number of code blocks is equal to or more than the predetermined threshold value, the second base station determining, using the processor, not to perform the muting process on the data signal component for the mobile station.

15. The wireless communication method according to claim 13, further comprising:
when the number of code blocks for the mobile station is less than a predetermined threshold value, the second base station executing, using the processor, the muting process to override all data signal component for the mobile station that is transmitted in the overlapping time interval with a null symbol; and
when the number of code blocks is equal to or more than the predetermined threshold value, the second base station executing, using the processor, the muting process to override a portion of the data signal component for the mobile station with a null symbol, the portion being transmitted within the overlapping time interval.

16. The wireless communication method according to claim 13, further comprising:
the second base station executing, using the processor, the muting process to override a portion of the data signal component transmitted in the overlapping time interval with a null symbol, an amount of the portion being inversely proportional to the number of code blocks of the data signal component for the mobile station.

17. The wireless communication method according to claim 13, further comprising:
when multiple code blocks of the data signal component for the mobile station are transmitted in the overlapping time interval, the second base station equally muting, using the processor, a portion of each of the multiple code blocks on the basis of an amount of resource to be muted.

18. The wireless communication method according to claim 13, further comprising:
the first base station determining, using the processor, a state of intercell interference on the basis of received power information of a cell of the first base station and received power information of a cell of the second base station and transmitting a muting request signal to the second base station when having determined to implement the muting process due to the intercell interference.

19. The wireless communication method according to claim 18, further comprising:
  the second base station determining, using the processor, whether to execute the muting process on the basis of a number of received muting request signals.

* * * * *